Sept. 5, 1933.           C. H. LANK           1,925,145
                        WATER GAUGE
                     Filed Dec. 28, 1928
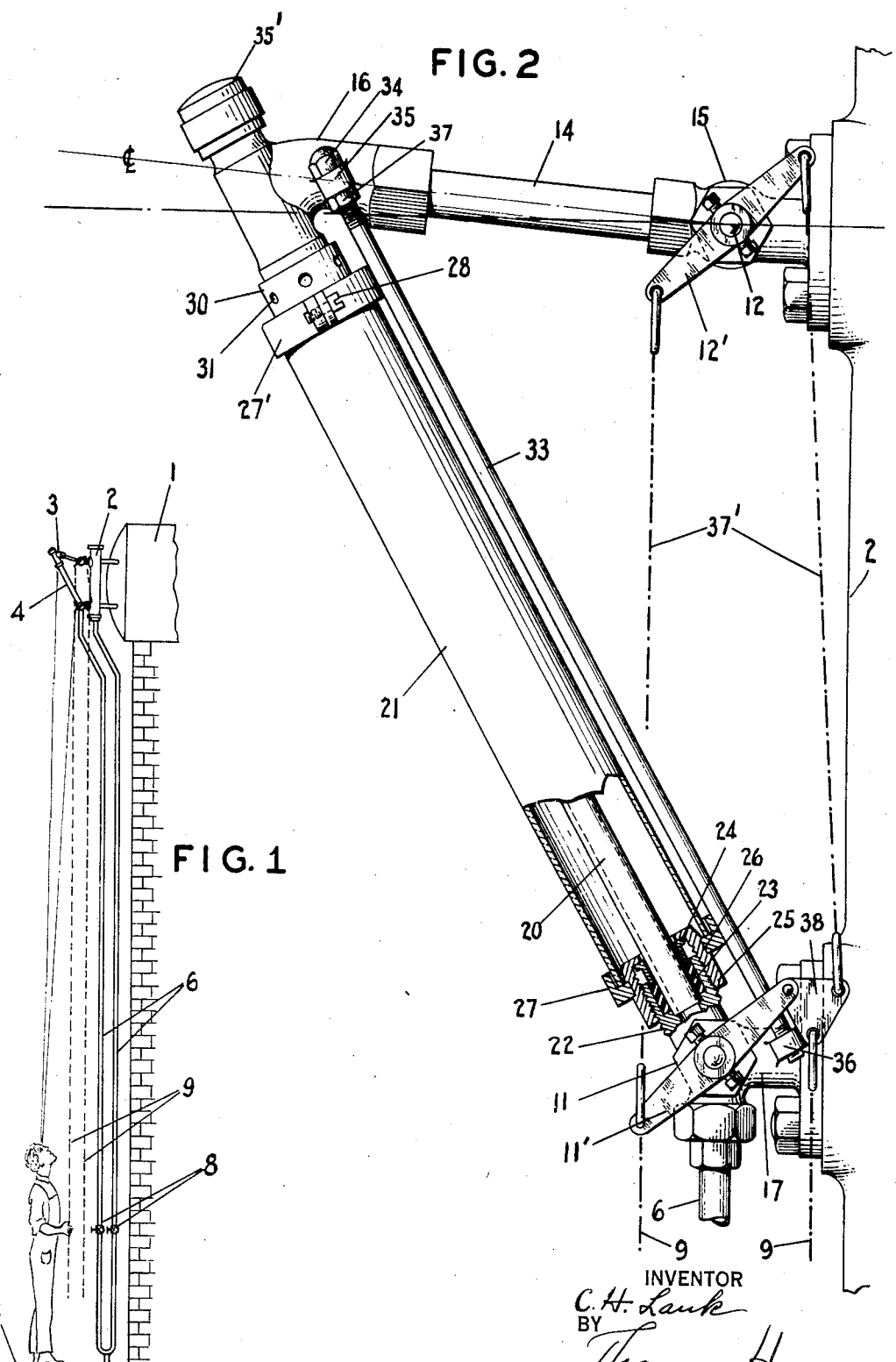
INVENTOR
C. H. Lank
BY
Thomas Howe
ATTORNEY Patented Sept. 5, 1933

1,925,145

UNITED STATES PATENT OFFICE 1,925,145

WATER GAUGE

Clarence H. Lank, Brooklyn, N. Y.

Application December 28, 1928
Serial No. 328,952

6 Claims. (Cl. 73—54)

This invention relates to indicating apparatus and more especially to water level gauges for steam boilers in which it is desired to indicate the normal level of a liquid. With the increase in size of steam boilers it is becoming more and more necessary to place the water drums and the water columns connected thereto at a considerable height above the floor, usually 20 feet or more. With the increase in height of the water level gauge it becomes more and more difficult for the attendant to see it and to manipulate it properly in order to regulate the blow down valves which are usually located in a position approximately and vertically below the vertical water level gauge. From this position it is very difficult to quickly and reliably ascertain the true water level as shown by the gauge owing to the very small projected length of the glass viewable from a point of vision, approximately in a vertical line below the tube.

Improvements have been made in the construction of water gauges which are particularly adapted to overcome this difficulty. One method of accomplishing this result is described and fully set forth in my Patent 1,307,982 patented June 24, 1919. This particular gauge is more particularly adapted for use in connection with boilers for generating comparatively low or medium pressure steam therein. However, certain difficulties exist with this type of construction when it is utilized with high pressure steam. The present gauge may also be advantageously used with low pressure boilers.

Owing to the increased temperature of the high pressure steam, greater difficulty is had in the use of glass or other transparent material gauges for indicating the water level. It has been found that when an inclined water gauge such as is shown in my patent above mentioned, is used with high pressure steam, difficulty is encountered from condensed steam running down the lower wall of the inside of the gauge glass, thereby eroding the glass until it in a short time becomes so worn that it is disrupted or obscures the vision of the water within the glass to such an extent that replacement is necessary.

It is therefore an object of this invention to provide a gauge with an inclined glass which shall be relieved of the erosion effect of the condensed steam from the upper fitting, falling or flowing on the inner surface of the gauge glass tube, and this is accomplished by draining condensate which forms in said fitting away from the gauge glass.

It is a further object of the invention to avoid the erosive action of condensate formed within the inclined gauge glass itself. This may be accomplished by heat insulating the tube.

Another object of the invention is to provide a water gauge with an inclined glass gauge tube which may be substantially free from erosion accasioned by condensed steam.

Another object of the invention is to substantially prevent erosion of the inclined glass gauge tube by condensed steam and at the same time provide a rugged and inexpensive construction by draining condensate away from the glass tube in certain of the gauge parts and heat insulating other of the gauge parts to prevent the formation of condensate therein.

Another object of this invention is to provide an inclined water gauge which is readily attachable in place of a previously used vertical water gauge without modification of the water column in any respect or the manner of securing the fittings thereto.

Another object is to provide an inclined water gauge for use and application in conjunction with a vertical water column but having a greater length than previously utilized inclined water gauges of the same angle of inclination.

Another object of the invention is to provide an inclined water gauge for use in connection with the water column of a steam boiler or like apparatus having a steam return tube or upper pipe fitting which produces an inclination of the the upper pipe, downwardly from the upper end of the gauge tube towards the water column so that any condensate forming therein will be conducted into the water column rather than into the water gauge.

A still further object is to provide an inclined water gauge for a steam boiler water column which is insulated from atmospheric temperature so that condensation of the steam within the water gauge tube is negligible.

A still further object is to provide fittings for an inclined water gauge which are adapted to prevent any condensate from eroding the gauge glass.

Further and more definite objects will appear from the following specification, claims and drawing in which Fig. 1 shows my improved gauge glass in the position assumed in actual use; and Fig. 2 shows an enlarged elevation (partially in section) of my improved gauge connected to the water column, parts having been shown in section to more clearly illustrate the construction.

Referring now more particularly to the drawing, the steam drum 1 is associated with a conventional form of steam boiler of well known make and is provided with a water column 2 with which is connected my improved form of water gauge 3 with an inclined gauge glass 4. Beneath this gauge glass is the operating floor 5 and connections 6 for blow down valves 8. Also directly underneath the gauge are the valve operating chains 9 for controlling the valves 11 and 12 shown more clearly in Fig. 2. It is apparent from the construction indicated that the operator of the blowdown valves 8 and the chains 9 may be in such a position as to readily inspect and determine the level of the liquid within the gauge glass 4. He may also operate the blow down valve without moving from this position. It would be impossible to inspect a vertical type gauge arranged in the same position and at the same time operate the necessary controls for these testing purposes.

However while the ordinary type of inclined gauge, as indicated in my prior patent, may advantageously be used in some locations, in other places of use considerable difficulty has been encountered by the condensed steam running down inside of the gauge glass and causing erosion therein. To overcome this difficulty certain measures have been taken and the construction of the gauge has been modified accordingly. It has been determined that the condensate which finds its way down through the gauge glass originates in two places, namely in the upper connection pipe and that which condenses directly within the gauge glass proper.

Previous gauge glasses of the vertical type have not ordinarily felt this difficulty because of their vertical position and also because their upper connection was somewhat shorter than is necessary for an inclined gauge glass. With a shorter connection less condensation occurs. Also vertical gauge glasses have heretofore been provided with nipple elements extending downwardly into the gauge glass proper, so as to collect the condensate inside of the gauge glass and direct it away from the side walls, in such a way that it will fall downwardly to the water level without striking the sides of the glass. This added precaution has substantially overcome any difficulty in connection with vertical gauge glasses. This difficulty has not been obviated in connection with slanting or inclined type water gauges, because it is impossible to direct the discharge of the condensate to the water level without contacting the walls of the inclined gauge glass by means of a nipple or equivalent means owing to the slanting of the gauge tube.

In order to overcome this difficulty the longer or upper connection pipe 14, of the inclined gauge has been so arranged as to slant downwardly from the upper end of the gauge glass into the water column so that any condensation occurring therein will be directed back into the water column rather than allowed to drip down upon the gauge glass itself. By properly arranging the fittings both for the upper end of the gauge glass and for the connection between the pipe 14 and the water column, the proper amount of inclination of the pipe 14 is produced. Thus the fitting 15 having the valve 12 therein is not a right angle fitting but is arranged with a small inclination. This is also true of the fitting 16 at the upper end of the gauge glass. The lower fitting 17 containing the valve 11 has its seat for the gauge glass in alinement with that of the upper fitting. The angles between the parts are arranged according to the desired relations between the various center lines in order to prevent undue strain on any of the parts whereby the gauge glass might be subjected to possible breakage or leakage. With the parts arranged at the angles substantially as indicated a very effective arrangement is provided for preventing condensate from running down within the gauge glass from the upper connection pipe 14. This portion of the gauge therefor, comprising moving parts and irregular configuration which would be difficult to heat insulate, is provided for in another way. This is of particular importance in the case of high pressure steam. Any condensate formed within the tube is also liable to cause erosion by running down the lower wall of the glass tube and cannot be taken care of by drainage as just described. In order to take care of this condition within the tube, the gauge glass proper 20 is heat insulated against the surrounding air. If this gauge glass can be maintained at a temperature above that at which condensation will occur and yet be visible, this difficulty of condensation is obviated. To approach this as nearly as desired an outer enclosing tube 21 of glass or other transparent material, whereby an air chamber is formed between the tubes 20 and 21 may be used. In utilizing this covering the usual gauge glass fittings may be modified.

The glass 20 may be inserted within the portion 22 having the packing 23 arranged in a recess therein. The gland 24 may be forced downwardly against this packing by means of the nut 25 on the outside. On the outside of this nut there is a groove 26 in which is clamped or otherwise secured the collar 27. As shown, it may be clamped directly into the groove by means of screws the same as the similar clamp collar 27' at the other end of the tube is secured by the screws 28, or in any other desired manner. If desired the outer surface of the nut 25 may also be threaded and the collar 27 screwed thereon. The inner nut 25 may be provided with holes for connecting a spanner wrench or equivalent device or the outer surface of this nut may be given the customary hexagon configuration. A similar nut is shown at 30 having such holes 31 therein. The rods 33 (one on each side of the gauge) or braces extend through the lugs 35 on the fitting 16 and are screwed into the lugs 36 on the fitting 17, and serve to space the fittings and insure that they are held in proper adjustment. The upper end of each rod 33 is secured in proper relation to the lugs 35 by nuts 34 and 37 on the rod and bearing upon opposite sides of the lug.

The gauge glass 20 may be inserted within the fittings 16 and 17 by removing the top nut 35' and sliding the tube 20 through the opening and into the fitting 17. The nuts 30 and 25 may then be tightened in the ordinary manner so as to secure the gauge glass in place without leakage. The outer covering or insulating glass tube 21 may be secured in place, in the manner as previously described, prior to the insertion of the tube 20 or in any other suitable way.

Chains 37' including an equalizing member 38, connect the operating arm 11' fixed on the stem of the valve 11 with a similar arm 12' fixed on the stem of the valve 12 so that both valves may be readily operated by the chains 9.

It is apparent from this construction that the gauge glass, on account of inclination of the pipe 14 is somewhat longer than would be the case if the connection were horizontal. This aids the visibility of the glass. The fact that the return tube 14 is inclined downwardly towards the water column 2 prevents the water from running down through the fitting 16 and into the gauge glass 20. Any condensation which takes place within the fitting is thus caused to be returned to the water column. Also the covering 21 on the outside of the gauge glass 20 substantially prevents condensation of the steam on the side walls so that there is no perceptible deterioration on the inside of the glass from this cause.

By the combination of these two means the gauge glass is effectively prevented from being eroded and a readily manufactured, strong and rugged gauge structure is obtained which has been found to outlast inclined gauges of other constructions. The outer glass covering 21 also serves as a protection to a considerable extent of the gauge glass 20 without detracting from its effectiveness. Gauge glass fittings constructed according to the above specification may be utilized to readily replace gauge-glass fittings of other constructions, including both previously utilized inclined gauges and vertical type gauges. It is always necessary to arrange the water column 2 substantially vertical because often times float devices and other mechanisms are employed therein which requires this vertical positioning. By the angular arrangement above set forth it will be observed that the proper inclination of the gauge glass and other parts may be effected in connection with that arrangement of the water column.

While the invention has been illustrated in connection with what is considered its best application, it may have other embodiments without departing from its spirit and is not therefore limited to the structure shown in the drawing.

What I claim is:

1. A water gauge having an inclined gauge tube and an upper gauge connection communicating with said tube and comprising an upper fitting, said connection being inclined downwardly away from said gauge tube to drain condensed steam away from said gauge tube and prevent it from dropping or flowing on the wall of the inclined gauge tube and eroding said tube and a lower gauge connection communicating with the lower end of said tube.

2. The combination with a vertical water column, of a water gauge having an inclined gauge tube, an upper connection communicating with said tube and between said tube and said water column, said connection being inclined downwardly from said tube to said column whereby condensed steam is drained away from said tube into said column and erosion of said tube by condensed steam from said connection is prevented, and a lower connection communicating with the lower end of said tube and between said tube and said column.

3. The combination with a vertical water column, of a water gauge having an inclined gauge glass, an upper fitting attached to said column and having an angular relation therewith at its lower side greater than 90°, a fitting attached to the upper end of said glass and making an acute angled connection therewith, a gauge connecting pipe secured to and establishing communication between said fittings, said connection pipe being inclined downwardly from said gauge glass to said water column whereby water therein is drained away from said glass and prevented from entering and eroding the same and a lower connection establishing communication from the lower end of said gauge glass to said water column.

4. The combination with a water column, of a water gauge having an inclined gauge glass, connections establishing communication from said gauge glass to said water column and including upper and lower fittings supporting said gauge glass, said fittings being attached to said water column, the upper one of said connections being arranged with an inclination downwardly toward said water column whereby water in said upper connection is drained into said water column.

5. A water gauge having an inclined gauge glass, upper and lower connections establishing communication with said glass, all of the said upper connections being inclined downwardly away from the gauge glass and transparent heat insulating means about said glass to prevent condensate from forming on the walls of said glass.

6. The combination with a water column having a vertical axis, of a water gauge having an upper gauge connection at an obtuse angle, on its lower side, to said column and communicating with the gauge glass and transparent heat insulating means about said glass whereby erosion of the glass by condensed steam is substantially prevented and a lower connection communicating with the lower end of said gauge glass and said column.

CLARENCE H. LANK.